Dec. 20, 1949  G. HOHWART ET AL  2,491,611
DIAPHRAGM CHUCK
Filed July 13, 1946  2 Sheets-Sheet 1
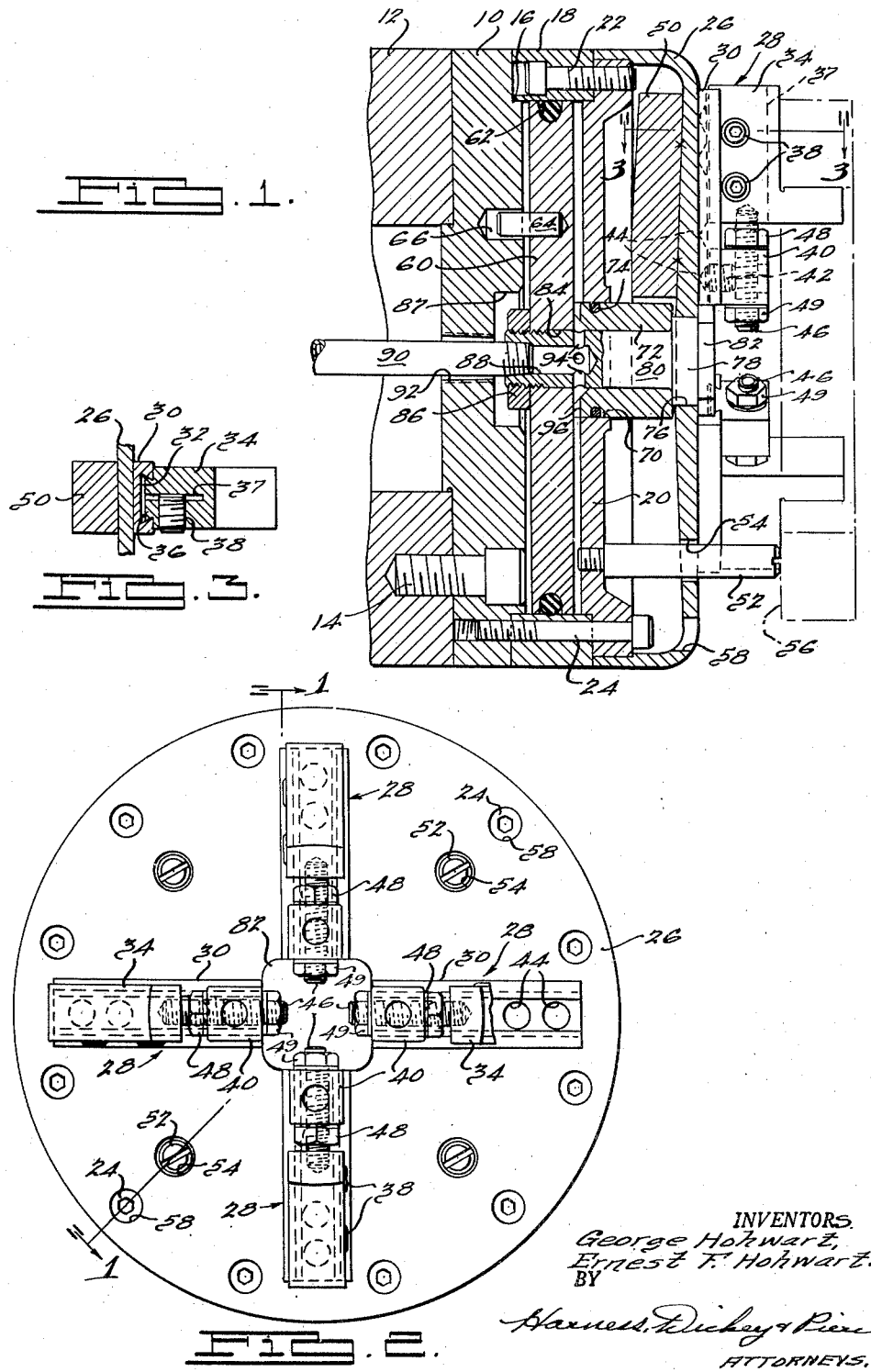
INVENTORS.
George Hohwart,
Ernest F. Hohwart.
BY
Harness, Dickey & Pierce
ATTORNEYS.

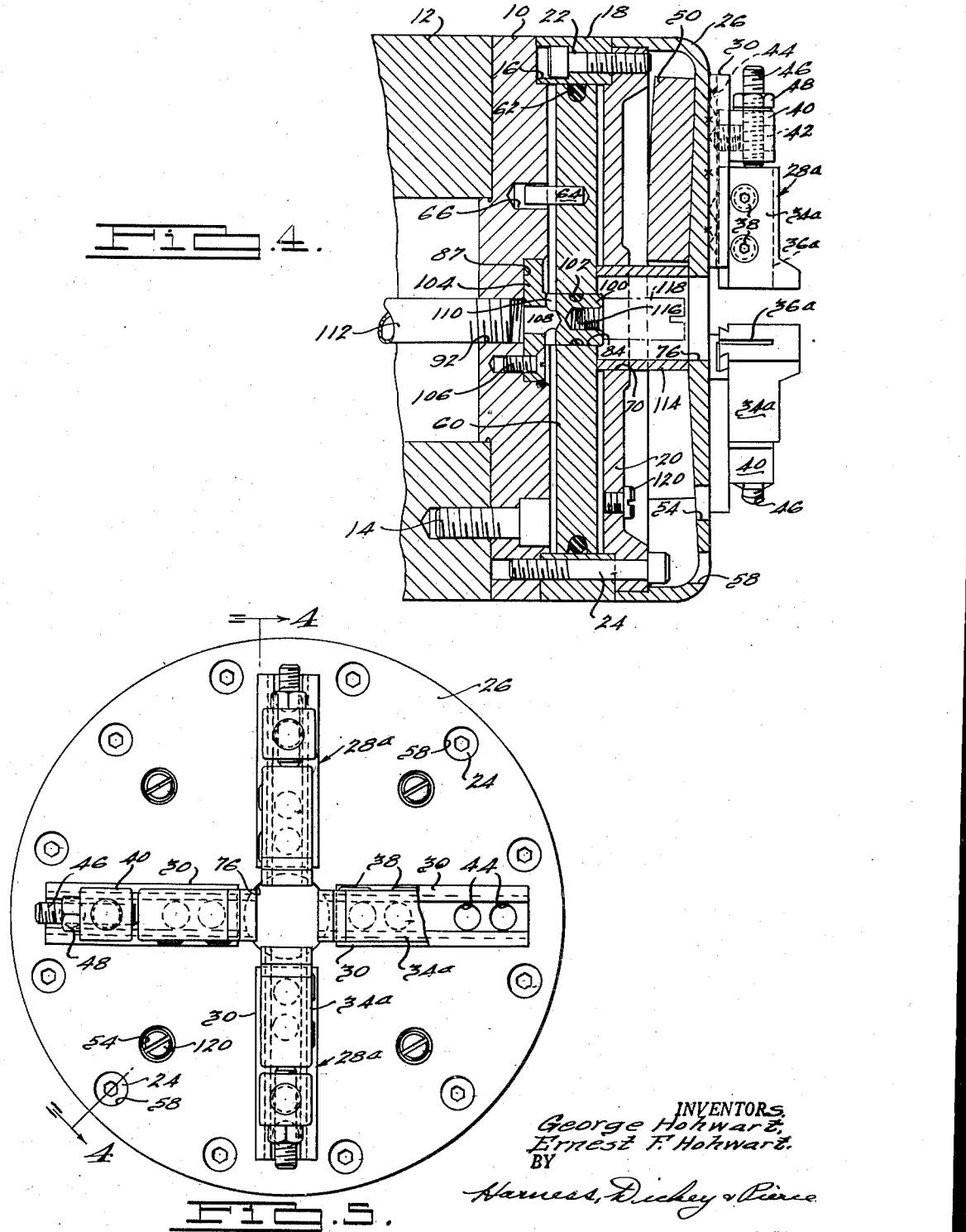

Patented Dec. 20, 1949

2,491,611

UNITED STATES PATENT OFFICE 2,491,611

DIAPHRAGM CHUCK

George Hohwart and Ernest F. Hohwart, Detroit, Mich., assignors to N. A. Woodworth Company, Ferndale, Mich., a corporation of Michigan Application July 13, 1946, Serial No. 683,458

8 Claims. (Cl. 279—4)

This invention relates to diaphragm chucks and has for its principal object the provision of a chuck of this type of new and improved design and construction.

Objects of the invention include the provision of a diaphragm chuck having fluid pressure operated means built thereinto for the purpose of operating the chuck in the releasing of a piece of work therein; the provision of a diaphragm chuck formed to provide a cylinder axially inwardly of the diaphragm, which cylinder is provided with a fluid actuatable piston therein operatively connected with the diaphragm for the purpose of enabling it to flex the diaphragm in a direction to open the jaws thereof to release a piece of work therefrom; the provision of a construction as above described in which the chuck is readily adaptable for internal or external chucking operations; and the provision of a chuck of the type described in which the means interconnecting the piston with the diaphragm also serves to seal the interior of the chuck against the passage of chips or the like from the work receiving bore in the chuck and in conjunction with a backing plate to seal the cylinder from contamination by chips or other foreign material.

Further objects of the invention include the provision of a diaphragm chuck including a mounting plate adapted to be secured to a machine tool spindle and a backing plate fixed in forwardly spaced relation with respect thereto, serving to form a closed cylinder therebetween, the diaphragm being secured at its periphery relative to the mounting plate, and a piston being axially slidable in the cylinder and being operatively connected at its center to the diaphragm for the purpose of flexing the same in a direction to release the piece of work from the jaws thereof; the provision of a construction as above described in which the backing plate is spaced from the mounting plate by a ring which forms a cylinder for the piston; the provision of means in a chuck of the type described for actuating the diaphragm from the piston including a sleeve member slidably projecting through the backing plate and operatively associated at its opposite ends with the piston and diaphragm, respectively; the provision of a construction as above described in which the sleeve member is relatively closely but slidably imperforate and is relatively closely but slidably received in the backing plate, thereby enabling it to be sealed to the backing plate when the chuck is adapted for internal chucking operations and thereby prevent the leakage of the actuating fluid from around sleeve member; the provision of a construction as above described in which the sleeve member provides a bore into which work may be projected when the chuck is adapted for external chucking operation and, being imperforate, prevents chips from escaping from such bore to the interior of the chuck; the provision of a construction as above described wherein the piston is provided with a central bore and a stop pin member or mount therefor for limiting the depth of insertion of work into the chuck is relatively slidably received in the bore and fixed at its rear end to the mounting plate; and the provision of a chuck of the type described in which the backing plate is imperforate except for the central opening therein which receives the sleeve member, thereby permitting the chuck to be adapted for internal chucking operations; and the provision of a diaphragm chuck of new and novel construction.

The above being among the objects of the present invention, the same consists in certain novel features of construction and combinations of parts to be hereinafter described with reference to the accompanying drawing, and then claimed, having the above and other objects in view.

In the accompanying drawing which illustrates suitable embodiments of the present invention and in which like numerals refer to like parts throughout the several different views;

Fig. 1 is a longitudinal sectional view taken centrally through a diaphragm chuck adapted for internal chucking operations, as on the line 1—1 of Fig. 2;

Fig. 2 is a partially broken face view of the chuck shown in Fig. 1;

Fig. 3 is a fragmentary sectional view taken on the line 3—3 of Fig. 1 and illustrating the manner in which the jaws are mounted on the face of the diaphragm;

Fig. 4 is a view similar to Fig. 1 but illustrating an adaptation of the chuck in the present invention for external chucking operations; and Fig. 5 is a partially broken face view of the chuck shown in Fig. 4.

The present invention deals with a diaphragm chuck constructed for operation by fluid pressure. Because of its novel features of construction, it is capable of being arranged for either internal or external chucking operations requiring the diaphragm to be flexed in respectively opposite directions, but regardless of this adaptability, it will be appreciated from the following description that it includes a number of novel features among which is a self-contained fluid pressure operated chuck unit.

Referring now to the accompanying drawing and particularly to Figs. 1, 2 and 3 which illustrate the chuck of the present invention adapted for internal chucking operations, it will be noted that the chuck in question includes a disk-like mounting plate 10 shown piloted upon the axially outer end of a machine tool spindle 12 and secured thereto as by means of screws 14. The axially outer face of the mounting plate 10 is shouldered as at 16 and piloted concentrically thereon is a ring member 18, the bore of which provides a cylinder bore as will hereinafter be more fully appreciated. A backing plate 20 is provided with a shouldered axially rear face piloted in the bore of the ring member 18 and is secured thereto by means of screws 22. Screws 24, which project rearwardly through the backing plate 20 and ring 18 and thread into the mounting plate 10, serve to maintain these three parts in unitary assembled condition. The diaphragm 26 is of the cup-shaped type disclosed in U. S. Patent No. 2,403,599, issued July 9, 1946, and is positioned in concentric relation with respect to the remainder of the chuck with its open side facing rearwardly and piloted over the periphery of the backing plate 20 to which it may be secured in any suitable manner as far as the present invention is concerned, but is preferably welded or brazed thereto as disclosed and claimed in one of our copending applications hereinafter identified.

On the forward face of the diaphragm 26 is secured a plurality of jaw assemblies indicated generally at 28. While any desired number of these jaw assemblies 28 may be provided, for the purpose of illustration four are shown in the illustrative embodiments in the drawings and these are arranged in equally angularly spaced relation about the axis of the chuck. The jaw assemblies themselves form no part of the present invention but do form the subject matter of our copending application for Letters Patent of the United States for improvements in Diaphragm chuck filed July 13, 1946, and serially numbered 683,457, now Patent No. 2,464,507. Each jaw assembly comprises a radially elongated jaw base 30 which, as best brought out in Fig. 3, is provided with a radially directed dovetail groove 32 in its axially outer face. Each jaw assembly includes a jaw member 34 provided with a dovetail rib 36 on its axially inner face which interfits the groove 32 of the corresponding jaw base 30 and each jaw is, therefore, radially adjustably mounted on its jaw base 30. Each jaw member 34 is centrally slotted as at 37 from its radially inner to its radially outer edges and from its axially inner face to a point approaching but spaced from its axially outer face. One or more setscrews 38 threaded through one side of each jaw member 34 bears at its inner ends against the opposite slotted side of the jaw member so that upon being tightened up they cause the axially inner edge of the corresponding jaw member to be spread whereby to be frictionally gripped in the groove 32 of the corresponding jaw base 30.

An adjusting screw supporting member 40 is also slidably mounted in the groove 32 of each jaw base 30, in the case shown in Figs. 1-3 inclusive, it being positioned at the radially inner end of the jaw base 30. It is locked in place on the jaw base by means of a setscrew 42 threaded therethrough in parallel relation to the axis of the chuck and its inner end seats in a depression 44 in the bottom of the groove 32 of the corresponding jaw base. An adjusting screw 46 is threaded radially into each jaw 34 and slidably projects through each corresponding member 40 in which it is locked against rotation. Each screw 46 is provided with an adjusting nut 48 on its radially outer side as shown, and is locked in adjusted position by means of a lock nut 49 on its radially inner end. The setscrew 42 is of such length and so positioned that when the adjusting screw 46 is threaded into the support 40 it overlies the axially outer face of the setscrew 42 and prevents it from becoming inadvertently disengaged from the recess 44 with which it is engaged. In this connection it will be noted that the jaw base 30 is provided with a plurality of depressions 44 for the purpose of permitting the support 40 to be locked thereto in a plurality of radially different positions, and to be placed on the radially outer side of the corresponding jaw 34 when the chuck is adapted for external chucking operations, as illustrated in Figs. 4 and 5.

Preferably, but not necessary where the chuck is adapted for external chucking operations, a counterweight such as 50 is fixed to the axially inner side of the diaphragm 26 in line with each jaw assembly 28 so as to offset the tendency of the jaw assemblies from flexing the diaphragm axially outwardly under the effects of centrifugal force during operation. Preferably the jaw bases 30 and counterweights 50 are secured to the diaphragm 26 by brazing or welding as disclosed and claimed in our copending application for Letters Patent of the United States for improvements in Diaphragm chuck filed July 13, 1946, Serial No. 683,456. Where the chuck is adapted for internal chucking operations, then, of course, it is impossible to use a central axial stop for the work, and to provide such stop means a plurality, shown as four, of stop pins 52 are projected through corresponding openings 54 in the diaphragm 26 and threaded at their rear end into the backing plate 20. The stop pins 52 are, of course, equally angularly spaced from each other and arranged with their axes in the same circle concentric with the axis of the chuck and one is positioned midway between each adjacent pair of chuck jaw assemblies 28. The forward ends of the pins 52 project axially forwardly so as to engage the axially inner face of a piece of work such as indicated at 56 in Fig. 1. It may also be noted at this point that the diaphragm 26 is provided with a plurality of openings 58, one in line with each screw 24 so as to permit removal of the screws 24 through the diaphragm.

In accordance with the present invention, a piston 60 is reciprocably received within the ring 18 and between the mounting plate 10 and backing plate 20. These last numbered parts are preferably spaced from each other only an amount slightly in excess of the movement required for the central portion of the diaphragm in order to flex it to release a piece of work from the jaws thereon. In the particular case shown, the periphery of the piston 60 is sealed to the bore of the ring 18 by means of a resilient O-ring seal 62 received in a peripheral groove in the piston 60. Preferably, a pin such as 64 fixed in the piston 60 and in parallel relation to the axis thereof is provided and is relatively loosely received in a complementary bore 66 in a mounting plate so as to prevent rotation of the piston 60.

Inasmuch as the construction illustrated in Figs. 1, 2 and 3 is a chuck adapted for internal chucking operations, in order to release a piece of work from the jaws 34 it is necessary to flex the central portion of the diaphragm 26 rearwardly, and in order to accomplish this result through the piston 60 the following mechanism is provided. The backing plate 20 is provided with a central bore 70 in which is relatively closely but axially slidably received a sleeve member 72 which is sealed against leakage to the bore 70 by means of an O-ring sealing member 74 received in a peripheral groove in the sleeve 72 within the axial length of the bore 70. The diaphragm 26 is likewise provided with a concentric opening 76 which relatively closely receives the shouldered portion 78 of a pin 80, the head 82 of which overlies the axially forward face of the diaphragm 26 around the margins of the opening 76. The pin 80 projects through and is relatively closely received by the bore of the sleeve 72 and projects rearwardly through a central opening 84 in the piston 60 and on the axially inner face of the piston has threaded thereon a nut 86 which lies within a central pocket or recess 87 in the forward face of the mounting member 10. While the sleeve 72 may abut at both its axially inner and outer ends against the piston 60 and diaphragm 26, respectively, in the particular construction shown, the shoulder 78 is of a greater axial depth than the thickness of the diaphragm 26 at the opening 76 and, consequently, in tightening up the nut 86, the pin 80, sleeve 72 and piston 60 are all rigidly secured together for equal movement, but this assembly is capable of a limited amount of axial movement with respect to the center of the diaphragm 26, this being preferably under some circumstances at least in order to permit the diaphragm to more readily adjust itself to the work being chucked. In order to flex the central portion of the diaphragm 26 rearwardly by fluid pressure acting on the piston 60, it is, of course, necessary to introduce such fluid pressure to the space between the axially outer face of the piston 60 and the axially inner face of the backing plate 20. In order to accomplish this, the rear end of the pin 80 is provided with an axial opening 88, the rear end portion of which is threaded for reception of the pipe or tube 90 which may be suitably connected to a suitable source of fluid under pressure. The tube 90 projects rearwardly and freely through a threaded opening 92 in the mounting member 10. The opening 92 has an additional function which will later be apparent. In substantial alignment with the forward face of the piston 60, the pin 80 is provided with a plurality of radial openings 94 communicating the bore 88 with the periphery of the pin. The openings 94 are communicated by notches 96 in the axially inner face of the sleeve 72 with the space between the forward face of the piston 60 and the rear face of the backing plate 20. Accordingly, when fluid under pressure is applied to the tube or pipe 90, it flows through the opening 88, out through the openings 94 and through the notches 96 to the forward face of the piston 60, causing the piston 60 to move axially rearwardly or inwardly and in doing so acting through the pin 80 to flex the center of the diapragm 26 rearwardly or axially inwardly, thereby to contract the jaws 34. When the jaws are so contracted, a piece of work such as 56 may be removed from the jaws 34 and replaced by a new piece of work, whereupon by relieving the fluid pressure on the piston, the diaphragm will return towards its unflexed condition which will spread the jaws 34 to grip the piece of work applied thereto.

In Figs. 4 and 5 the same chuck as shown in Figs. 1, 2 and 3 is illustrated but modified to serve as an external chuck. Inasmuch as the majority of parts are identical to those illustrated in Figs. 1, 2 and 3, such parts are illustrated by the same numerals and require no further explanation, the changes only being explained.

In the case of Figs. 4 and 5, the construction being adapted for external chucking, jaws 34a are substituted for the jaws 34 of the previously described construction, the only difference being that in this case the axial extensions in the first described constructions providing axially parallel radially outer faces for gripping the bore of the piece of work are dispensed with, the jaws 34a in this case being provided with short inner axial extensions simply to provide a greater axial length for engagement with the work. Furthermore, in this case, the jaws 34a are positioned at the radially inner end of the jaw bases 30 and the members 40 positioned radially outwardly therefrom. Thus, in this case, the members 40 being mechanically locked to the jaw bases 30 through the setscrews 42 engaging the depressions 44, serve as a positive stop to prevent the jaws 34a from flying radially outwardly under centrifugal force in event they should become inadvertently loosened in the bases 30.

In the construction illustrated in Figs. 4 and 5, inasmuch as the central portion of the diaphragm 26 requires to be flexed axially outwardly to release the jaws 34a from a piece of work gripped therein, it is necessary to introduce the fluid under pressure for actuating the jaws to the rear face of the piston 60 and between such rear face and the forward face of the mounting plate 10. To accomplish this, the pin 80 of the first described construction is removed and in its place is substituted a pin member 100 which is closely but slidably received in the central bore 84 of the piston 60 and is sealed thereto by an O-ring 102 received in a peripheral groove of the pin 100 intermediate the front and rear walls of the piston 60. The pin 100 is formed integrally with a concentric mounting flange 104 which is closely received in the recess 87 in the mounting plate 10 and is rigidly secured therein by means of screws 106. The pin 100 and its base 104 is provided with a central aperture 108 leading from the axially inner face of the flange 104 which communicates with radial passages 110 in the pin 100 leading to the space between the axially inner face of the piston 60 and the forward face of the mounting plate 10. A tube or pipe 112 is in this case threaded directly into the central opening 92 in the mounting plate 10 and is adapted to be suitably connected to a suitable source of fluid under pressure. Thus, when fluid under pressure is introduced through the tube or pipe 112 it flows through the passages 108 and 110 to the rear face of the piston 60 and causes it to be moved axially outwardly or forwardly.

To transmit this forward motion from the piston 60 to the diaphragm 26 to cause the latter to be flexed outwardly at its center in order to open the jaws 34a to release or receive a piece of work, a tube 114 is relatively closely but axially slidably received in the central opening 76 of the backing plate 20. Its rear end is adapted to abut the forward face of the piston 60 and its forward end abuts the rear face of the diaphragm 26 around the margin of the opening 76. Inasmuch as no fluid pressure is transmitted to the forward face of the piston 60 in this construction, it is not necessary to seal the sleeve 114 to the walls of the opening 70 as in the first described construction. The forward end of the pin 100 is provided with a central threaded opening 116 in which the inner threaded end of a stop pin such as 118 may be fitted. The stop pin 118 projects axially outwardly of the chuck so as to engage the inner end of a piece of work clamped in the jaws 34a to position it axially thereon. Stop pins 118 of various lengths may be mounted on the pin 100 to correspond with the particular piece of work being machined.

It will be noted that in the construction illustrated in Figs. 4 and 5, the piston 60 is mounted for axial movement on the central pin 100 as well as being guided at its periphery in the bore of the ring 112. It will also be appreciated that the changes required to adapt the particular chuck construction shown to either external or internal chucking operations are of a relatively minor nature and require the substitution of a minimum number of parts. It will also be noted that in both constructions the sleeves interposed between the piston and the diaphragm, number 72 in the first described construction and number 114 in the second described construction, effectively prevent any chips from finding their way behind the diaphragm 26 from getting back of the backing plate 20 and thus interfering with the proper operation of the chuck. Furthermore, in the construction shown in Figs. 4 and 5, the sleeve 114 is effective to prevent chips which may find their way into the interior of the sleeve 114 from passing outwardly to the space between the backing plate 20 and the diaphragm 26. In this connection, it will, of course, be appreciated that any chips that should find their way into this area will be thrown out centrifugally through the openings 58.

Having thus described our invention, what we claim by Letters Patent is:

1. In a diaphragm chuck, in combination, a mounting member, means for securing said mounting member to the spindle of a machine tool, a ring member secured in concentric relation with respect to said mounting member and projecting forwardly therefrom, a backing plate secured in concentric relation with respect to said ring member and in axially spaced relation with respect to said mounting member, and a diaphragm peripherally secured in concentric relation with respect to the aforementioned parts, jaw devices secured to the axially outer face of said diaphragm, a piston reciprocable in and sealed to the bore of said ring member, an actuator operatively interconnecting said piston and diaphragm for interrelated movement in at least one direction, said actuator slidable in and sealed to said backing member, and means for introducing fluid under pressure to a face of said piston.

2. In a diaphragm chuck, in combination, a mounting member, means for securing said mounting member to the spindle of a machine tool, a ring member secured in concentric relation with respect to said mounting member and projecting forwardly therefrom, a backing plate secured in concentric relation with respect to said ring member and in axially spaced relation with respect to said mounting member, a diaphragm peripherally secured in concentric relation with respect to the aforementioned parts, jaw devices secured to the axially outer face of said diaphragm, a piston reciprocable in and sealed to the bore of said ring member, a sleeve member concentric with the aforementioned members interposed between the axially inner face of said diaphragm and the axially outer face of said piston serving to interconnect them for interrelated movement in at least one direction, said sleeve member being closely but slidably received by said backing member so as to prevent chips and other foreign matter from entering the space occupied by the piston, and means for introducing fluid under pressure to a face of said piston.

3. In a diaphragm chuck, in combination, a mounting member, means for securing said mounting member to the spindle of a machine tool, a ring member secured in concentric relation with respect to said mounting member and projecting forwardly therefrom, a backing plate secured in concentric relation with respect to said ring member and in axially spaced relation with respect to said mounting member, and a diaphragm peripherally secured in concentric relation with respect to the aforementioned parts, jaw devices secured to the axially outer face of said diaphragm, a concentric pin fixed with respect to said mounting member and projecting forwardly therefrom, a piston reciprocally received in the bore of said ring member between said backing member and said mounting member slidable on said pin, means connecting said pin to said piston, and an imperforate sleeve interposed between said diaphragm and the forward face of said piston concentric therewith projecting through and sealed to said backing plate and guided for axial movement therein, said sleeve connecting said piston and diaphragm for interrelated movement, and means for introducing fluid under pressure between the axially inner face of said piston and the axially outer face of said mounting member.

4. In a diaphragm chuck, in combination, a mounting member, means for securing said mounting member to a machine tool spindle, means carried by said mounting member forming a cylinder concentric therewith on the axially outer side thereof, a backing plate closing the axially outer face of said cylinder, a diaphragm peripherally fixed with respect to said backing plate in concentric relation with respect to said chuck, a piston reciprocable in said cylinder, a sleeve member concentric with the axis of said chuck interposed between the axially inner face of said diaphragm and the axially outer face of said piston, said sleeve member projecting through said backing plate and being closely but slidably guided thereby, means effecting a seal between said sleeve member and said backing plate, means for transmitting the force of a rearward movement of said piston in said cylinder to the central portion of said diaphragm, and means for introducing fluid under pressure to the space between said piston and said backing plate.

5. In a diaphragm chuck, in combination, a mounting member, means for securing said mounting member to a machine tool spindle, means carried by said mounting member forming a cylinder concentric therewith on the axially outer side thereof, a backing plate closing the axially outer face of said cylinder, a diaphragm peripherally fixed with respect to said chuck, a piston reciprocable in said cylinder, a sleeve member concentric with the axis of said chuck interposed between the axially inner face of said diaphragm and the axially outer face of said piston, said sleeve member projecting through said backing plate and being closely but slidably guided thereby, means effecting a seal between said sleeve member and said backing plate, a pin projecting through said sleeve member having a head overlying the outer face of said diaphragm, said pin projecting rearwardly through said piston, and means carried by the opposite ends of said pin cooperating with the rear face of said piston and the outer face of said diaphragm for transmitting the force of a rearward movement of said piston to the central portion of said diaphragm, said pin having passages therethrough leading to the space between said piston and said backing member for introducing fluid under pressure into said space.

6. In a diaphragm chuck, in combination, a mounting plate, a diaphragm fixed with respect to said plate in axially outwardly spaced relation with respect thereto, cylinder means positioned between said mounting member and the rear wall of said diaphragm, a piston reciprocable in said cylinder, means for introducing fluid under pressure to a face of said piston to cause reciprocation thereof in said cylinder means, means interconnecting said diaphragm and piston to effect movement of the former upon movement of the latter under the effects of said fluid pressure, and a stop pin mounting member fixed with respect to said mounting member projecting forward therefrom through said piston and sealed with respect to the latter, said stop pin mounting member being adapted to support stop means for limiting movement of a piece of work to be held in the chuck, in an axially inner direction.

7. In a diaphragm chuck, a mounting member, means for securing said mounting member to the spindle of a machine tool, a ring member secured to said mounting member in concentric relation therewith and projecting forwardly therefrom, a backing plate secured concentrically to said ring member in axially spaced relation with respect to said mounting member, a diaphragm peripherally secured in concentric relation with respect to the aforementioned parts and provided with a central opening, jaw devices carried by said diaphragm and arranged concentrically around said opening, a piston reciprocable in and sealed to the bore of said ring member, a tubular actuator operatively interconnecting said piston and diaphragm for interrelated movement in at least one direction, said actuator slidable in and sealed to said backing member, means forming a seal between the actuator and said diaphragm around said opening to prevent chips and the like from entering said opening and lodging behind said diaphragm, and means for introducing a fluid under pressure to a face of said piston.

8. In a diaphragm chuck, a mounting member, means for securing said mounting member to the spindle of a machine tool, a ring member secured to said mounting member in concentric relation therewith and projecting forwardly therefrom, a backing plate secured concentrically to said ring member in axially spaced relation with respect to said mounting member, a diaphragm peripherally secured in concentric relation with respect to the aforementioned parts and provided with a central opening, jaw devices carried by said diaphragm and arranged concentrically around said opening, a piston reciprocable in and sealed to the bore of said ring member, a tubular actuator operatively interconnecting said piston and diaphragm for interrelated movement in at least one direction, said actuator being slidable in and sealed to said backing member and abutting at its forward end against said diaphragm around said opening to effect a seal between the actuator and the diaphragm which prevents chips and the like from entering the opening and lodging behind said diaphragm, and means for introducing a fluid under pressure to a face of said piston.

GEORGE HOHWART.
ERNEST F. HOHWART.

REFERENCES CITED

The following references are of record in the file of this patent:

UNITED STATES PATENTS

| Number | Name | Date |
|---|---|---|
| 152,779 | Fleet | July 7, 1874 |
| 1,341,015 | Lavoie | May 15, 1920 |
| 1,426,541 | Bisset | Aug. 22, 1922 |
| 1,918,955 | Bechert | July 8, 1933 |
| 1,934,411 | Dahlman | Nov. 7, 1933 |
| 1,956,318 | Draper | Apr. 24, 1934 |
| 2,403,599 | Hohwart et al. | July 9, 1946 |

FOREIGN PATENTS

| Number | Country | Date |
|---|---|---|
| 474,962 | Great Britain | 1937 |